(12) United States Patent
Ishida

(10) Patent No.: US 9,740,471 B2
(45) Date of Patent: Aug. 22, 2017

(54) INFORMATION PROCESSING APPARATUS, AND INFORMATION PROCESSING METHOD

(71) Applicant: CANON KABUSHIKI KAISHA, Tokyo (JP)

(72) Inventor: Tomoya Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 14/332,128

(22) Filed: Jul. 15, 2014

(65) Prior Publication Data

US 2015/0026672 A1    Jan. 22, 2015

(30) Foreign Application Priority Data

Jul. 18, 2013 (JP) ................................. 2013-149873

(51) Int. Cl.
G06F 9/44    (2006.01)
G06F 9/445    (2006.01)

(52) U.S. Cl.
CPC ..................................... G06F 8/65 (2013.01)

(58) Field of Classification Search
CPC ....................................................... G06F 8/65
USPC ....................................................... 717/170
See application file for complete search history.

(56) References Cited

U.S. PATENT DOCUMENTS 6,216,196 B1 * 4/2001 Elwell et al. ................. 710/240
7,093,147 B2 * 8/2006 Farkas et al. ................. 713/320
8,446,624 B2 * 5/2013 Kim ..................... H04N 1/00241
                                                358/1.13
8,594,850 B1 * 11/2013 Gourlay ................. G05B 15/02
                                                165/11.1
8,631,330 B1 * 1/2014 Hwang ................. G06F 3/0484
                                                715/707

(Continued)

FOREIGN PATENT DOCUMENTS

JP    2000-293377 A    10/2000
JP    2004078745 A     3/2004

(Continued)

OTHER PUBLICATIONS

Brother International, "FAQs & Troubleshooting—Configure or change the settings of the ControlCenter 2 or 3 scanning options," Jul. 26, 2010, last retrieved from http://www.brother-usa.com/FAQs/SC_Solution.aspx?SCNumber=faq002561_000&Category=Operational&Sympt . . . on Jan. 22, 2017.*

(Continued)

*Primary Examiner* — Wei Zhen
*Assistant Examiner* — Andrew M Lyons
(74) *Attorney, Agent, or Firm* — Canon U.S.A., Inc. IP Division

(57) ABSTRACT

An apparatus in which at least two pieces of software capable of controlling a device may be installed, each of the pieces of software capable of controlling a device, the apparatus including a setting unit provided by a first piece of software, the setting unit being capable of controlling the device, and a determining unit configured to determine whether the device is to be controlled by a second piece of software that is different from the first piece of software. In this case, if the determining unit determines that the device is to be controlled by the second piece of software, at least partial control of the device is suppressed on a setting screen of the setting unit.

8 Claims, 7 Drawing Sheets

(56) References Cited

U.S. PATENT DOCUMENTS

| | | | |
|---|---|---|---|
| 8,776,092 B2* | 7/2014 | Plache et al. | 719/328 |
| 8,855,618 B2* | 10/2014 | Hwang et al. | 455/418 |
| 2007/0038946 A1* | 2/2007 | Grieshaber | H04N 1/00464 |
| | | | 715/762 |
| 2008/0127053 A1* | 5/2008 | Stubbs et al. | 717/106 |
| 2008/0184269 A1* | 7/2008 | Avery | G06F 9/542 |
| | | | 719/318 |
| 2010/0287495 A1* | 11/2010 | Kano | G06F 9/4443 |
| | | | 715/794 |
| 2011/0162036 A1* | 6/2011 | Heo | 726/1 |
| 2011/0181910 A1* | 7/2011 | Suzuki | 358/1.15 |
| 2011/0219369 A1* | 9/2011 | Kumagai | 717/174 |
| 2011/0321029 A1* | 12/2011 | Kern et al. | 717/170 |
| 2012/0120440 A1* | 5/2012 | Ueda | H04N 1/00938 |
| | | | 358/1.15 |
| 2012/0203379 A1* | 8/2012 | Sloo | F24F 11/0086 |
| | | | 700/276 |
| 2013/0169604 A1* | 7/2013 | Cho et al. | 345/204 |
| 2013/0174042 A1* | 7/2013 | Kim et al. | 715/735 |
| 2014/0019873 A1* | 1/2014 | Gupta et al. | 715/744 |
| 2014/0155123 A1* | 6/2014 | Lee et al. | 455/563 |

FOREIGN PATENT DOCUMENTS

| | | |
|---|---|---|
| JP | 2006268752 A | 10/2006 |
| JP | 2010160616 A | 7/2010 |
| JP | 2012073918 A | 4/2012 |

OTHER PUBLICATIONS

Seiko Epson Corporation, "Image Scan! for Linux User's Guide," 2012, last retrieved from https://dev.gentoo.org/~flameeyes/avasys/userg_revQ_e.pdf on Jan. 22, 2017.*

* cited by examiner

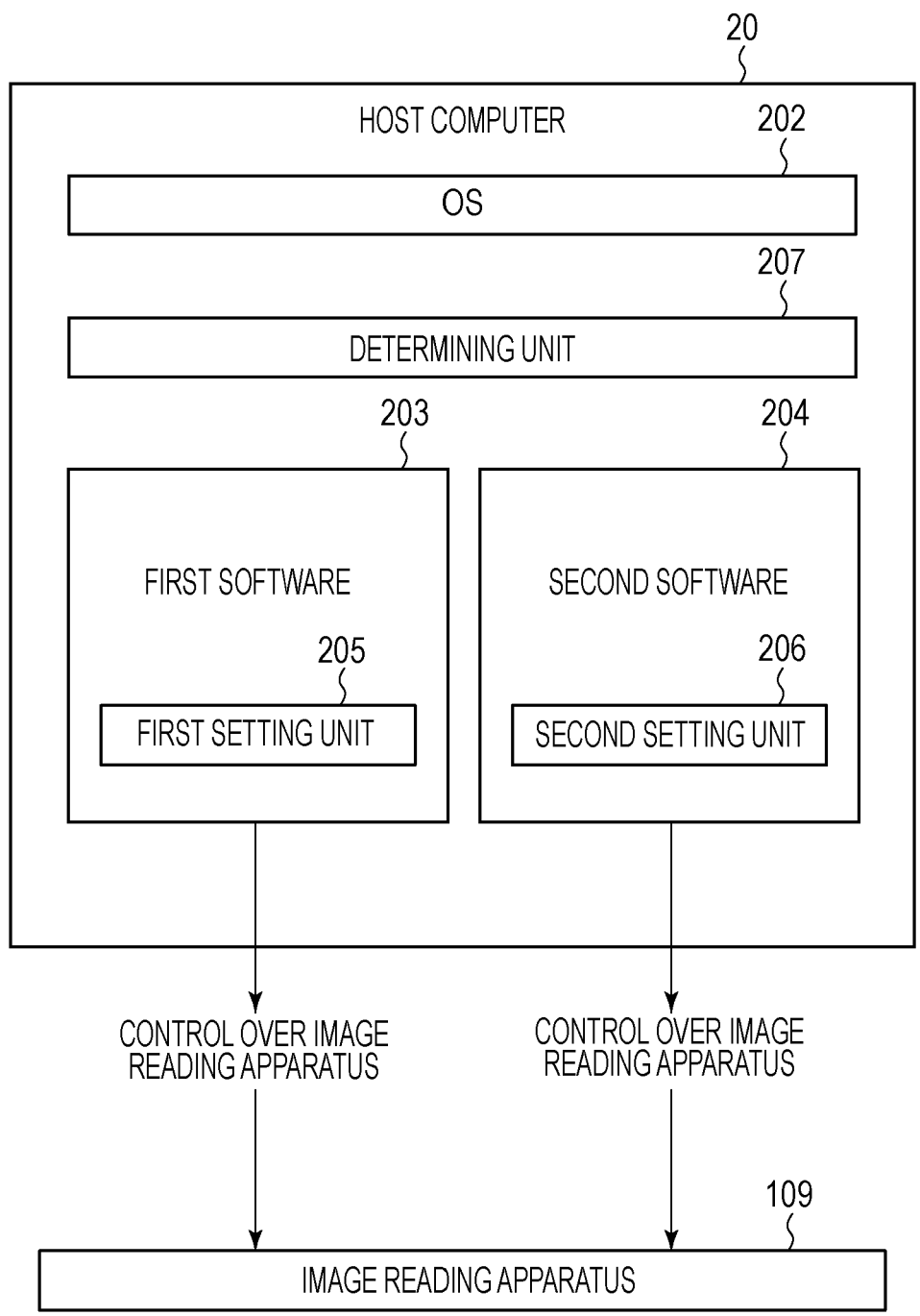

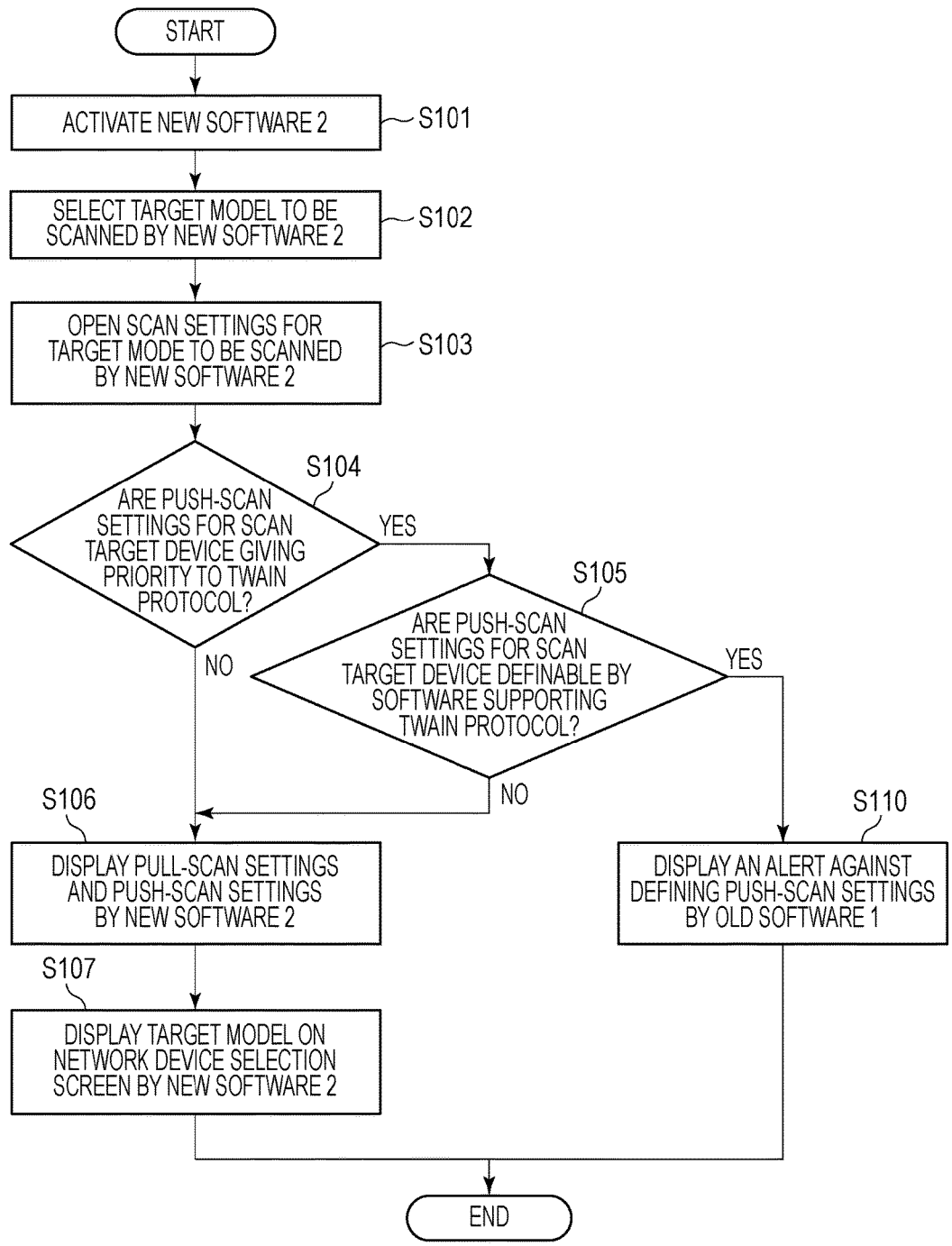

INFORMATION PROCESSING APPARATUS, AND INFORMATION PROCESSING METHOD

BACKGROUND

Field

Aspects of the present invention generally relate to information processing apparatuses and information processing methods for controlling a device by software.

Description of the Related Art

For release of an updated software version to upgrade a function of the software or to improve the software, a method has been known which overwrites an old version with the upgraded version of software by keeping its name. As a result of such software overwrite, it may not easy to use for users who have been accustomed to the operability of the old version of the software in some cases.

On the other hand, in some other cases, some versions of software may not be overwritten with a new version due to restrictions of a communication protocol between operating systems (hereinafter, called OSs) or programs. For example, communication protocols for scanners may include TWAIN (Technology Without An Interesting Name) and WIA (Windows (registered trademark) Image Acquisition). A need may rise for changing software supporting TWAIN protocol so as to support WIA protocol instead. However, TWAIN and WIA protocols may not implement an exactly same function. Accordingly, instead of updating a software version by overwriting, the software may be provided as a different piece of software by changing its name, for example. In this case, the old version of software and the new version of software may coexist on an OS. Furthermore, when new and old versions of software are configured for device control, there may be a case where the new and old versions of software may be capable of controlling one device.

Japanese Patent Laid-Open No. 2000-293377 proposes a method in an environment where two pieces of software coexist on an OS for constructing information regarding versions and identifiers of programs as a configuration file and automatically switching to a program of a version corresponding to a calling program with reference to the configuration file.

However, a "sandbox" technology may be used in some recent OSs, and software supporting the sandbox may not be allowed to refer to a setting file for other pieces of software. The "sandbox" technology may prevent a system from being invalidly operated for providing higher security. Software supporting the sandbox is restricted to operate within a protected region in a system and is not allowed to access a setting file for other pieces of software. In this way, software supporting the sandbox is not allowed to refer to settings for other pieces of software, like the conventional technology described above. A sandbox environment may further make it difficult to construct information regarding a plurality of programs as one configuration file as in the method disclosed in Japanese Patent Laid-Open No. 2000-293377.

SUMMARY

An aspect of the present invention generally provides for improving a user's convenience when a plurality of pieces of software control a device.

Accordingly, an aspect of the present invention provides an apparatus in which at least two pieces of software may be installed, each of the pieces of software capable of controlling a device, the apparatus including a setting unit provided by a first piece of software, the setting unit being capable of controlling the device, and a determining unit configured to determine whether the device is to be controlled by a second piece of software that is different from the first piece of software. In this case, if the determining unit determines that the device is to be controlled by the second piece of software, at least partial control of the device is suppressed on a setting screen of the setting unit.

Further features of the present disclosure will become apparent from the following description of exemplary embodiments with reference to the attached drawings.

BRIEF DESCRIPTION OF THE DRAWINGS

FIG. 2 is an exemplary diagram of a system configuration according to the first exemplary embodiment.

FIG. 7 is a flowchart illustrating setting processing for user interface screens in software according to a second exemplary embodiment.

DESCRIPTION OF THE EMBODIMENTS

Exemplary embodiments will be described below with reference to the accompanying drawings. It should be noted that the following exemplary embodiments are not intended to be limiting and that all combinations of characteristics described according to these exemplary embodiments are not always necessary for solutions provided by the exemplary embodiments.

First Exemplary Embodiment

Figure 1:
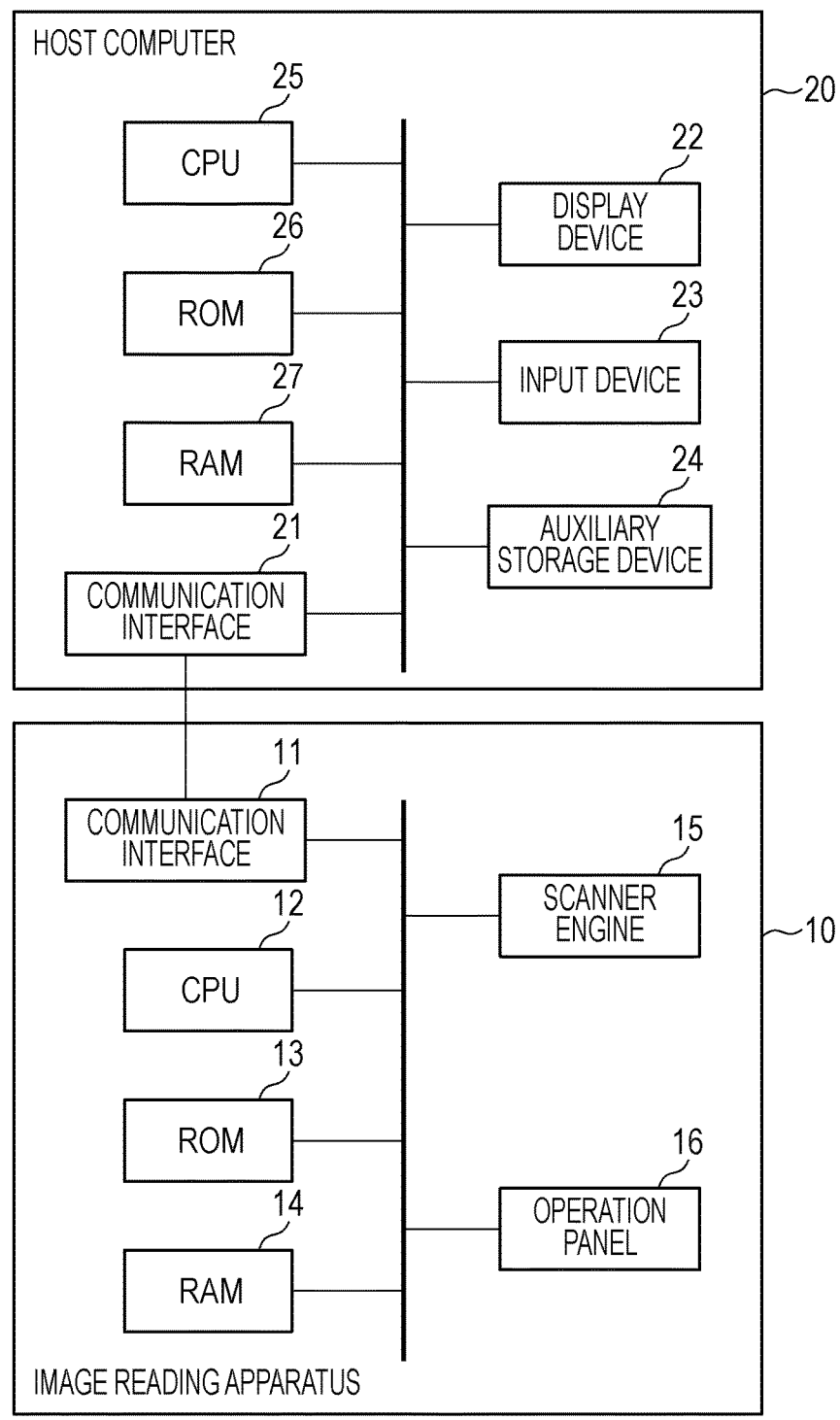
FIG. 1 is a block diagram illustrating an information processing system according to a first exemplary embodiment.

FIG. 1 illustrates a hardware configuration of an information processing system according to a first exemplary embodiment. The information processing system according to the present exemplary embodiment includes a host computer 20 and an image reading apparatus 10.

The host computer 20 (hereinafter, called a computer 20) issues an operation command to the image reading apparatus 10 and obtains image data from the image reading apparatus 10.

The computer 20 may have hardware resources including a communication interface 21, a display device 22, an input device 23, an auxiliary storage device 24, a CPU 25, a ROM 26, and a RAM 27. The computer 20 may be a general-purpose personal computer.

The communication interface 21 may exchange data with a peripheral device over a network.

The display device 22 may display various kinds of information including user interfaces (UIs) for operating the image reading apparatus 10 based on software installed in the computer 20.

The input device 23 may be implemented by a keyboard, a pointing device and so on and is usable for inputting information describing a user operation. The auxiliary storage device 24 may be implemented by an internal or external hard disk, for example, and may store information regarding operations of the image reading apparatus 10, such as a control program for the image reading apparatus 10.

The CPU 25 may load a program stored in the auxiliary storage device 24 or ROM 26 to the RAM 27 and execute it to control an operation of the computer 20.

The ROM 26 may store a program and information for causing the computer 20 to operate. For example, the ROM 26 may store basic software such as BIOS.

The RAM 27 may be used as a work area for the CPU 25 and may temporarily store software and information.

The image reading apparatus 10 may have hardware resources including a communication interface 11, a CPU 12, a ROM 13, a RAM 14, a scanner engine 15, and an operation panel 16. The communication interface 11 may exchange data with the computer 20 over a network. The CPU 12 may load a control program for the image reading apparatus 10 stored in the ROM 13 to the RAM 14 and execute it to control an operation of the image reading apparatus 10. The ROM 13 may store a control program and a parameter necessary for an operation of the image reading apparatus 10. The RAM 14 may be used as a work area for the CPU 12 and may also be used as a temporary storage region for state information on the image reading apparatus 10 and image data.

The scanner engine 15 may include a CCD color image sensor which may read a light source irradiating light to a document and its reflected light and perform photoelectric conversion thereon, for example. The scanner engine 15 may be caused to scan a document placed on a platen glass of the image reading apparatus 10 to read an image on the document and generate image data based on the read image. The operation panel 16 may include a display unit configured to display a state of the image reading apparatus 10 and a menu for works to be performed by a user and hard keys usable for performing various operations including a user instruction to start reading. The operation panel 16 may be a touch panel or devices having other forms.

Having described that the image reading apparatus 10 is a device dedicated to scan, a multifunction apparatus including such a scanning function and other functions such as printing function. Having described that a document is placed on a platen glass to scan and read an image on the document, a document conveying mechanism may be provided and the scanner engine 15 may be fixed to convey and scan a document. Reading may be started by the image reading apparatus 10 in response to a notification to the computer 20 of detection that a document to be read has been set to the image reading apparatus 10, instead of an operation using the operation panel 16. The image reading apparatus 10 may not have the CPU 12, and the scanner engine 15 may be operated under control of the computer 20. A monochromatic scanner may be used instead of a color scanner, or a film scanner configured to read a film may be used.

The information processing system according to the present exemplary embodiment includes the computer 20 and the image reading apparatus 10 connected over a network. In other exemplary embodiment, the computer 20 and the image reading apparatus 10 may be connected via a USB interface, or any other interface, and may exchange data with a peripheral device under the USB standard.

FIG. 2 is an exemplary diagram of a system configuration according to the present exemplary embodiment. The host computer 20 may include an OS 202, a first piece of software 203 and a second piece of software 204, and a determining unit 207.

The first piece of software 203 has a first setting unit 205, and the second piece of software 204 has a second setting unit 206. The first setting unit 205 and second setting unit 206 are capable of controlling the image reading apparatus 10. A user may utilize the first setting unit 205 in the first piece of software 203 to control the image reading apparatus 10. A user may also utilize the second setting unit 206 in the second piece of software 204 to control the image reading apparatus 10.

The determining unit 207 judges whether the image reading apparatus 10 is to be controlled by the first piece of software or whether the image reading apparatus 10 is to be controlled by the second piece of software.

According to the present exemplary embodiment, the first piece of software is an old version of software (hereinafter, called an old piece of software 1), and the second piece of software is a new version of software (hereinafter, called a new piece of software 2). These pieces of software may have setting screens for control over the scanner and implement scanning through the scanner based on settings thereon. It is assumed in the following description that the old piece of software 1 is a piece of software that supports TWAIN protocol and the new piece of software 2 is a piece of software that supports WIA protocol, for example. It should be noted that the piece of software 1 and piece of software 2 are not limited thereto but may support other protocols. According to the present exemplary embodiment, the pieces of software 1 and 2 individually control the image reading apparatus 10. In other exemplary embodiment, other devices may be controlled.

According to the present exemplary embodiment, the old piece of software 1 supports one model of a product called Product-X while the new piece of software 2 supports two models having a product name Product-X and a product name Product-Y. In other words, the product Product-X is supported by both of the old piece of software 1 and the new piece of software 2.

Figure 3A:
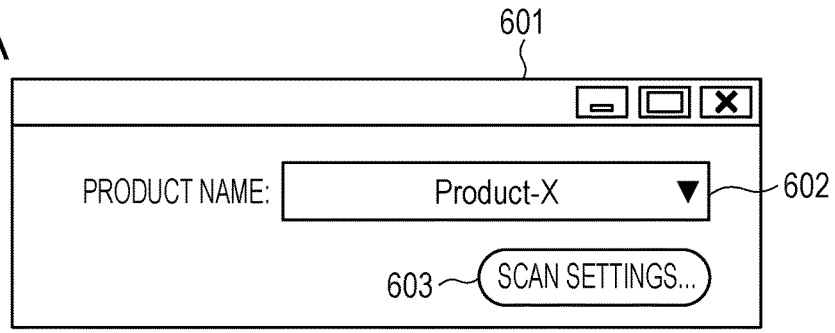
FIGS. 3A to 3C illustrate first device control screens according to software.
Figure 3B:
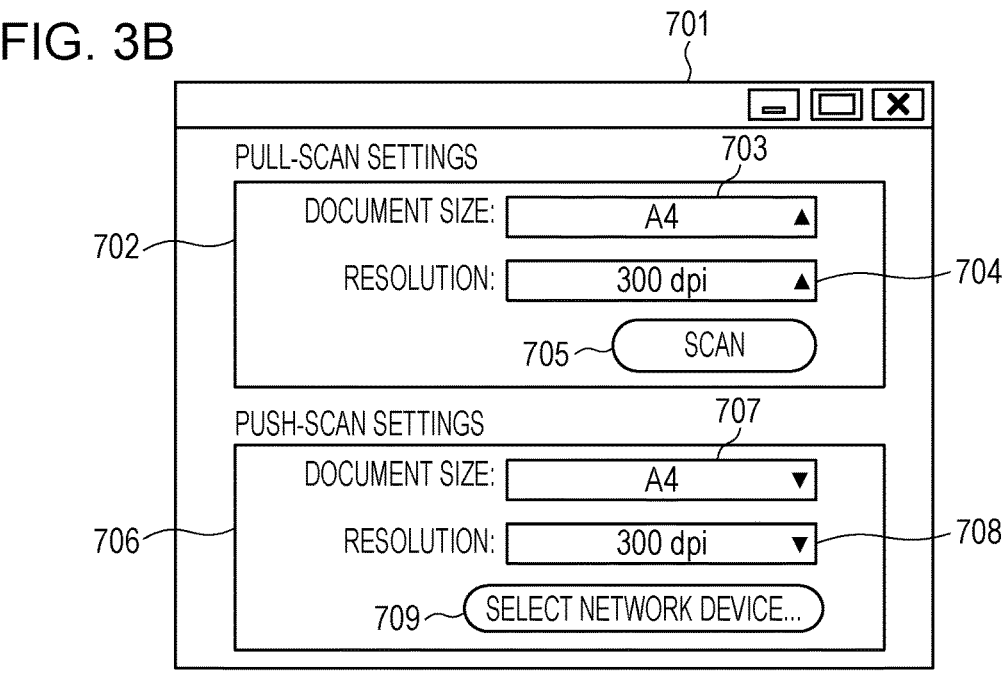
Figure 3C:
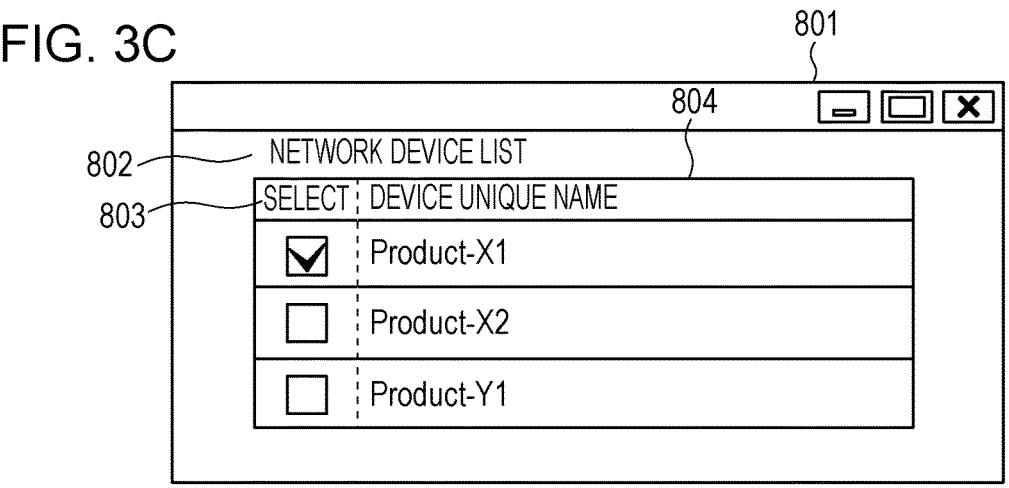

User interfaces of the old piece of software 1 and new piece of software 2 will be described with reference to FIGS. 3A, 3B, and 3C. FIGS. 3A, 3B, and 3C illustrate user interfaces of the new piece of software 2. More specifically, FIG. 3A illustrates a product-name selection screen 601, FIG. 3B illustrates a scan setting screen 701, and FIG. 3C illustrates a network device selection screen 801. The old piece of software 1 has a user interface corresponding to the first setting unit 205, and the new piece of software 2 has a user interface corresponding to the second setting unit 206.

When a piece of software (old piece of software 1 or new piece of software 2) is activated, the product-name selection screen 601 is first displayed. The product-name selection screen 601 has a product-selection list box 602 and a [SCAN SETTING . . . ] button 603. As illustrated in FIG. 3A, because the product-name selection screen of the new piece of software 2 supports two models having the product name Product-X and the product name Product-Y, it is displayed in a manner that one of them is selectable. A user may select a desired product name from the product-selection list box 602. Because the product-name selection screen, not illustrated, of the old piece of software only supports one model having the product name Product-X, the product-selection list box 602 displays Product-X only, and other devices are not selectable.

When the [SCAN SETTING . . . ] button 603 is pressed on the product-name selection screen 601, the scan setting screen 701 for the device selected from the product-selection list box 602 opens.

As illustrated in FIG. 3B, the scan setting screen 701 has a pull scan setting box 702 for scanning through a PC and a push scan setting box 706 for scanning in response to an operation on an operation panel of a device. Hereinafter, scanning through a PC will be called pull scan, and scanning in response to an operation on an operation panel of a device will be called push scan. The pull scan setting box 702 has a document size setting box 703, a resolution setting box 704, and a scan button 705 usable for actually executing pull scan. The push scan setting box 706 has a document size setting box 707, a resolution setting box 708, and a network device selection button 709. According to the present exemplary embodiment, scan settings include a document size setting and a resolution setting. However, scan settings may include a color mode setting and other settings. The scan setting screen of the old piece of software is similar to that of FIG. 3B.

In the pull scan setting box, a user may select a document size from the document size setting box 703 and selects a resolution from the resolution setting box 704 and presses the scan button 705. Thus, scanning is started under a condition set through the boxes.

When the network device selection button 709 is pressed in the push scan setting box, a network device selection screen is displayed.

As illustrated in FIG. 3C, the network device selection screen 801 displays a network device list 802. The network device list 802 includes check boxes under a device selection 803 and device unique names 804. Each of the device unique names refers to a name assigned uniquely over a network. The device unique name 804 displays a unique name of a searched device connected to a network. A user may determine a device to scan over a network through the corresponding check box in the device selection 803.

Referring to FIG. 3C, after a device is selected, polling to a device selected from a PC is started for executing push scan over a network. The device in response to the polling displays a PC name on an operation panel of the device. When a user selects a PC name on the operation panel of the device, scan is started from the device as a starting point to transfer scanned image to the PC. In this case, such a scanned image to be transferred has the document size selected through the document size setting box 707 and the resolution selected through the resolution setting box 708 by a user in FIG. 3B.

Referring to FIG. 3C, a total of three devices including two devices having the product name Product-X (or device unique names Product-X 1 and Product-X 2) and one device having the product name Product-Y (or a device unique name Product-Y 1) are connected over a network. As illustrated in FIG. 3C, when Product-X 1 is selected, polling from the PC to the Product-X 1 is started for executing push scan over the network. The Product-X 1 in response to the polling displays a PC name on an operation panel of the device. A user may select the PC name to perform scanning from the device as a starting point and transfer the scanned image to the PC. Having described that all of supported models (a device called Product-X and a device called Product-Y) are displayed on the network device list, a model selected in FIG. 3A may only be displayed.

The network device selection screen, not illustrated, of the old piece of software 1 also displays the network device list 802. The network device list 802 displays check boxes under the device selection 803 and device unique names 804. In this case, because the product name Product-Y is not supported under the device unique name, two devices of the Product-X (having device unique names Product-X 1 and Product-X 2) are displayed.

The first piece of software (old piece of software 1) and second piece of software (new piece of software 2) both control the image reading apparatus 10 through the aforementioned user interfaces of the pieces of software.

Here, the scan setting for the Product-X may be implemented from both of the old piece of software 1 and the new piece of software 2. In other words, because both of the old piece of software 1 and new piece of software 2 support the Product-X, the scan setting screen 701 for the Product-X as illustrated in FIG. 3B is displayed if the product name Product-X is selected on the product-name selection screen. Because the scan button 705 is displayed on the scan setting screen 701 for pull scan, a user may not be confused even when the two pieces of software have their own settings. However, because no scan button is displayed on the scan setting screen 701 for push scan, a user may not recognize which piece of software will scan. Thus, one piece of software may scan even though the other piece of software sets the scanning, which may confuse a user. Which piece of software is to be activated when the push scan is executed may be set by a piece of software bundled with an OS. However, a user may inconveniently be required to activate and set the bundled piece of software separately, and the setting operation may be hard to understand for some users.

Also, the old piece of software 1 and the new piece of software 2 both display their own network device selection screens. In this case, because the old piece of software 1 and the new piece of software 2 both support the Product-X, the product name Product-X is selectable on one of the screens. When the Product-X is selected by the two pieces of software, polling is performed from the two pieces of software to the Product-X. However, double polling from one PC is not desirable. For example, when polling is performed by the old piece of software 1 and the new piece of software 2, two same PC names are displayed on an operation panel of the device. Because both of them are the same name to a user, the user may not recognize which of the PCs having the PC name is to be scanned by which piece of software, confusing the user.

Figure 4A:
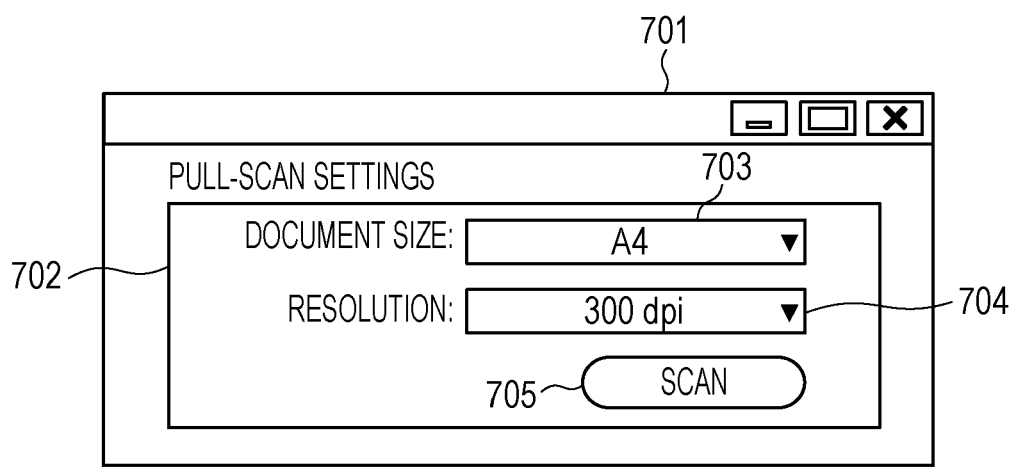
FIGS. 4A and 4B are second device control screens according to software.
Figure 4B:
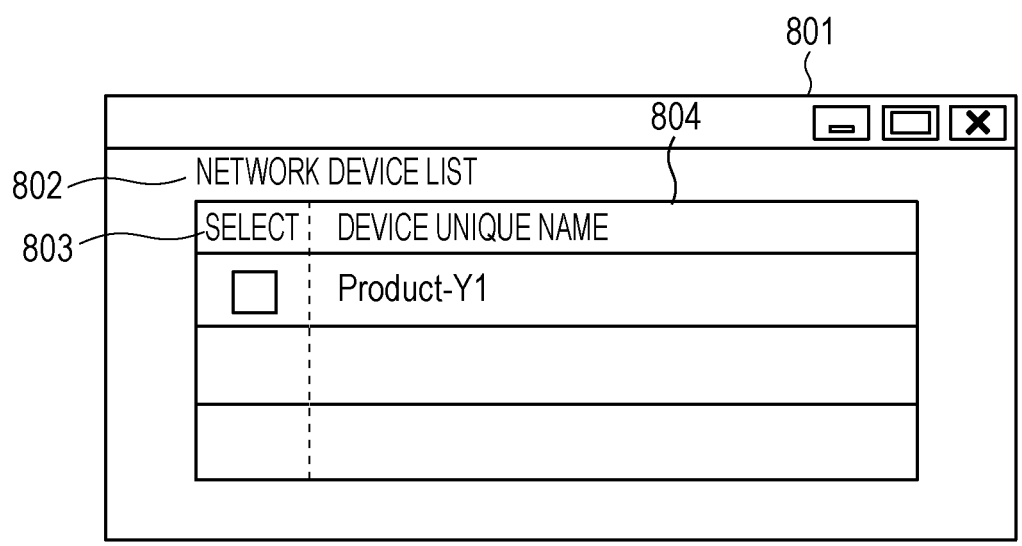

According to the present exemplary embodiment, a plurality of pieces of software are allowed to coexist, and a plurality of pieces of software are inhibited to define settings for one device. Here, the old piece of software 1 is allowed to define a scan setting for a device to be scanned (hereinafter called a scan target device). Furthermore, in a case where the old piece of software 1 is preferred for defining a scan setting for a scan target device, the device control by the old piece of software 1 is selected. More specifically, the push scan setting box 706 is hided in the new piece of software 2. The case where the old piece of software 1 is preferred for defining a scan setting for a scan target device may refer to a case where a scan setting for a scan target device supports TWAIN protocol by priority. In this case, if a piece of software subject to push scan, which is registered with an OS, does not support TWAIN protocol, like the new piece of software 2, settings for push scan should not be defined in the piece of software. On the other hand, when settings for push scan should or may not be defined in the old piece of software 1, settings for push scan are displayed in the new piece of software 2, as described above. The case where "settings for push scan should not be defined in the old piece of software 1" may be a case where TWAIN protocol is not set for a higher priority, for example. The case where "settings for push scan may not be defined in the old piece of software 1" may be a case where an OS does not support TWAIN protocol or where a piece of software (old piece of software 1, here) supporting TWAIN protocol is not installed, for example. FIGS. 4A and 4B illustrate setting screens in the new piece of software 2 in a case where scan settings for a scan target device may be defined in the old piece of software 1 and where scan settings for the scan target device should be defined in the old piece of software 1. Hereinafter, the screens provided by the new piece of software 2 illustrated in FIGS. 3A, 3B and 3C will be called first device control screens, and the screens provided by the new piece of software 2 illustrated in FIGS. 4A and 4B will be called second device control screens.

As illustrated in FIG. 4A, the scan setting screen 701 displays the pull scan setting box 702 while hiding the push scan setting box. The pull scan setting box 702 may include the document size setting box 703, the resolution setting box 704, and the scan button 705 usable for actually executing pull scan, like FIG. 3B.

If the scan button 705 is pressed, a network device selection screen provided by the new piece of software 2 as illustrated in FIG. 4B is displayed. The network device selection screen 801 displays the network device list 802, and the network device list 802 displays a check box under the device selection 803 and device unique names 804. In this case, one product name of the Product-Y is displayed under the device unique name, and no product name of the Product-X is displayed. Hiding the product name of the Product-Y in this way may prevent a user from selecting a product name of the Product-Y.

Figure 5:
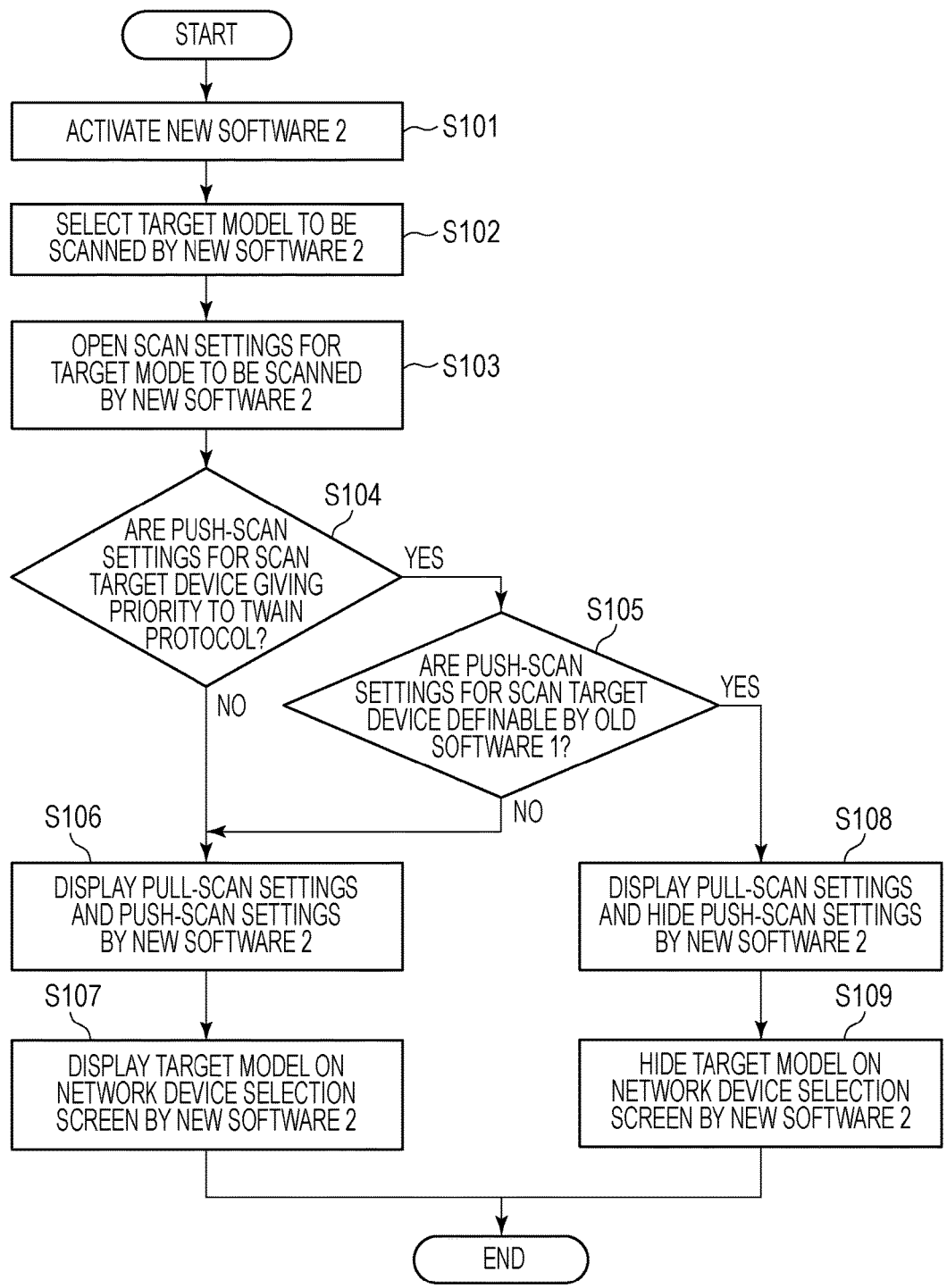
FIG. 5 is a flowchart illustrating setting processing for user interface screens in the software according to the first exemplary embodiment.

FIG. 5 is a flowchart for setting a user interface screen in the new piece of software 2 according to the present exemplary embodiment. The flow on the flowchart is executed by the CPU 25.

First, the new piece of software 2 is activated (step S101).

A user may select a desirable device in the product-selection list box 602 on the product-name selection screen 601 in the new piece of software 2 so that a scan target device (scan target model) is identified (step S102). It is assumed here the name of the device desired by a user is Product-X.

Next, if a user presses the [SCAN SETTINGS . . . ] button 603 on the product-name selection screen 601 in the new piece of software 2, the scan setting screen 701 opens (step S103). After that, the new piece of software 2 determines whether the push scan setting for the scan target device gives priority to TWAIN protocol or not (step S104).

If not, the new piece of software 2 displays the pull scan setting box 702 and push scan setting box 706 on the scan setting screen 701 as illustrated in FIG. 3B (step S106). Furthermore, the new piece of software 2 displays the product names Product-X1 and Product-X2 of the Product-X on the network device selection screen 801 as illustrated in FIG. 3C (step S107), and the setting processing ends. In other words, if the new piece of software 2 determines that TWAIN protocol is not given priority (NO in S104), the first device control screens are displayed, and the setting processing ends.

On the other hand, if the new piece of software 2 determines that TWAIN protocol is given priority (YES in step S104), the new piece of software 2 determines whether the push scan settings for the scan target device are definable by the old piece of software 1 (step S105).

If the new piece of software 2 determines that they are not definable by the old piece of software 1 (NO in step S105), the new piece of software 2 moves to step S106 and step S107, displays the first device control screen and finishes the setting processing.

On the other hand, if the new piece of software 2 determines that the push scan settings for the scan target device are definable by the old piece of software 1 (YES in step S105), the new piece of software 2 displays pull scan settings only, as illustrated in FIG. 4A, and hides push scan settings (step S108). As illustrated in FIG. 4B, the new piece of software 2 hides the scan target model Product-X (with device unique names Product-X 1 and Product-X 2) and displays a device unique name of the Product-Y (step S109). After that, the setting processing ends. In other words, the second device control screens are displayed, and the setting processing ends.

The determinations in step S104 and step S105 in the flow of the setting processing are performed by the determining unit 207.

Because operations to be performed when the old piece of software 1 is activated are normal operations without display control, the description will be omitted.

Figure 6:
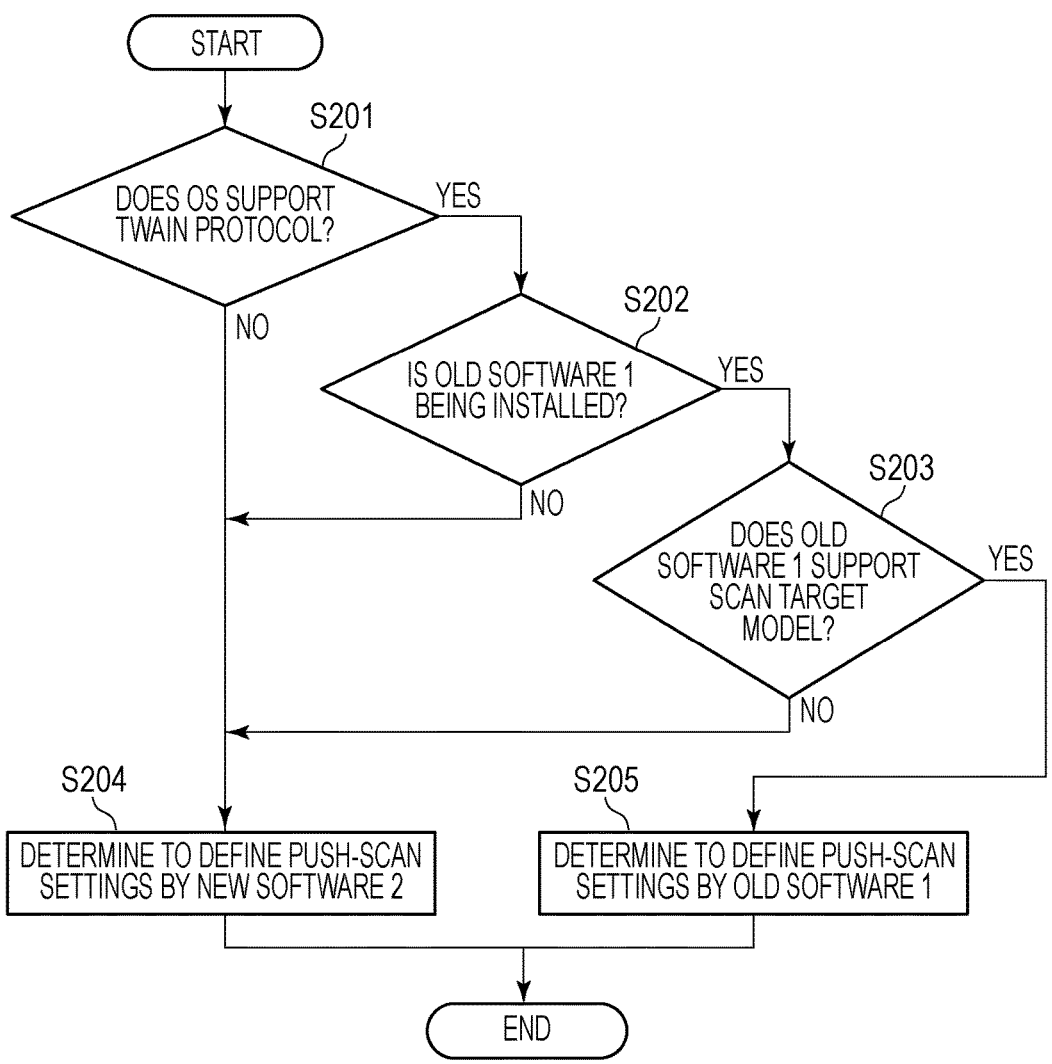
FIG. 6 is a flowchart illustrating determination processing in the setting processing for user interface screens in software according to the first exemplary embodiment.

The determination processing in step S105 will be described below in detail with reference to FIG. 6. FIG. 6 is a flowchart of the determination processing in step S105. In other words, FIG. 6 is a flowchart of the determination processing in which the new piece of software 2 determines whether push scan settings are definable by a piece of software that supports TWAIN protocol.

First, in step S201, the new piece of software 2 determines whether an OS therein supports TWAIN protocol or not. The method for this determination is not particularly limited, but, according to the present exemplary embodiment, it may be determined based on whether a library regarding TWAIN is being installed in the OS or not.

If the new piece of software 2 determines that the OS does not support TWAIN protocol (NO in step S201), the new piece of software 2 determines to define the push scan settings by itself (step S204).

On the other hand, if the new piece of software 2 determines that the OS supports TWAIN protocol (YES in step S201), the new piece of software 2 determines whether the old piece of software 1 is being installed (step S202). The method for this determination is not particularly limited, but, according to the present exemplary embodiment, it may be determined based on whether the old piece of software 1 exists therein by searching and referring to an install path of the old piece of software 1.

If the new piece of software 2 determines that the old piece of software 1 is not being installed (NO in step S202), the new piece of software 2 determines to define the push scan settings by itself (step S204).

On the other hand, if the new piece of software 2 determines that the old piece of software 1 is being installed (YES in step S202), the new piece of software 2 determines whether the old piece of software 1 supports the scan target model (step S203).

If the new piece of software 2 determines that the old piece of software 1 does not support the scan target model (NO in step S203), the new piece of software 2 determines to define the push scan settings by itself (step S204). In other words, the new piece of software 2 determines that the push scan settings for the scan target device are not definable by the old piece of software 1 (NO in step S105).

On the other hand, if the new piece of software 2 determines that the old piece of software 1 supports the scan target model (YES in step S203), the new piece of software 2 determines that the push scan settings are to be defined by the old piece of software 1 (step S205). In other words, the new piece of software 2 determines that the push scan settings for the scan target device are definable by the old piece of software 1 (YES in step S105).

As described above, in a case where a device is controlled by a plurality of pieces of software, the coexistence of the plurality of pieces of software and control of the device by one of the pieces of software are allowed while inhibiting control over the device by the other pieces of software. This may allow device control without causing user's confusion. More specifically, in a case where an old piece of software and a new piece of software are both capable of defining settings for a device, one of them may be inhibited to define the settings so that polling from two pieces of software to one device over a network may be prevented. This may further prevent display of a plurality of same PC names on the operation panel of the device so that settings may be defined without confusing a user.

Therefore, the selection of a scan target device by the new piece of software 2, for example, may not require the new piece of software 2 to refer to a setting file for the old piece of software 1 to determine whether the scan target device has already been selected by the old piece of software 1 or not. In other words, for selecting a scan target device, the new piece of software 2 may not be required to check the settings for the old piece of software 1, and cancel the selection by the old software 1 before selecting the scan target device if the old piece of software 1 has already selected the scan target device.

The use of the sand box technology may allow a setting to be defined by a proper one piece of software while preventing other pieces of software from defining the setting even when setting files for other pieces of software are not available for reference. Thus, the setting may be defined without causing user's confusion.

According to the present exemplary embodiment, in a case where a plurality of pieces of software are necessary to coexist, in other words, in order to prevent one piece of software from overwriting by another piece of software, one piece of software is allowed to control a device while inhibiting other pieces of software from controlling the device. Thus, the device may be controlled without causing user's confusion.

According to the present exemplary embodiment, in step S201, the new piece of software 2 determines whether the OS supports TWAIN protocol or not. In a case where TWAIN protocol is not supported by a future version of OS based on a result of the determination, push scan settings are displayed in the new piece of software 2 (which supports WIA) (step S106, step S107). This may eliminate the necessity for correcting and releasing the software even in a case where a future version of OS does not support TWAIN protocol.

Second Exemplary Embodiment

According to a second exemplary embodiment, in a case where a scan setting for a scan target device should be defined by an old piece of software 1, a new piece of software 2 warns that a push scan should be defined by the old piece of software 1, instead of hiding the setting. The description of similar configurations to those of the first exemplary embodiment will be omitted.

FIG. 7 is a flowchart in which processing in step S110 is replaced by processing in step S108 and step S109 in FIG. 5. Because step S101 to step S107 are the same as those in the first exemplary embodiment, the description will be omitted.

In step S105, if push scan settings for a scan target device are definable by the old piece of software 1 (YES in step S105), it is warned in step S110 that the push scan settings should be defined by the old piece of software 1. Thus, the user is guided to define the push scan settings in the old piece of software 1.

As described above, in a case where a plurality of pieces of software are capable of controlling a device, the plurality of pieces of software are allowed to coexist, and a user may be warned of a more proper piece of software if any. Thus, a user may select a proper piece of software to control the device, and user's confusion may be avoided. More specifically, in a case where the old piece of software 1 and the new piece of software 2 are both capable of defining settings for a device and if the push scan settings should be defined by the old piece of software 1, the new piece of software 2 warns it. Thus, a user may be guided so as to define push scan settings in the old piece of software 1 without causing the user to be confused.

OTHER EMBODIMENTS

The fundamental configuration of the present disclosure is not limited to the aforementioned configuration(s). The above-described exemplary embodiments are not seen to be limiting, and use of other similar methods and/or different parameters is included in the scope of the present disclosure as far as they provide equivalent effects to those of the present disclosure.

For example, in the first exemplary embodiment, the determination in step S104 is performed after a user opens the scan setting screen 701 (step S103). However, the timing for the determination in step S104 is not limited thereto but may be after a user activates the new piece of software 2 (step S101).

In the first exemplary embodiment, the determination on which of the old piece of software 1 and the new piece of software 2 should control a given device is not limited to the determination in step S104 and the determination in step S105. In other words, the determination is not limited determination with reference to protocols in a plurality of pieces of software. For example, in a system in which a piece of software that is a push scan target is registered with an OS therein, information on the registered piece of software may be obtained to determine to activate the registered piece of software by priority or determine to activate by priority a piece of software that has been registered earlier. It may be determined so as to give priority to a piece of software having a higher capability or give priority to a unique piece of software which always prioritizes WIA protocol, for example.

According to the above-described exemplary embodiments, control of a device by the new piece of software 2 is suppressed by hiding push scan settings for a target model in the new piece of software 2. In other exemplary embodiment, for example, the new piece of software 2 may activate the old piece of software 1 to display scan settings in the old piece of software 1. In other exemplary embodiment, for example, control of a device by the new piece of software 2 is suppressed by displaying setting screen so that user can not select at least partial control of the device.

According to the above-described exemplary embodiments, the display of the old piece of software 1 is not changed, but an embodiment of the present invention is not limited thereto. When a device should be controlled by the new piece of software 2, it may be notified that the device should be controlled by the new piece of software 2 when the old piece of software 1 is activated. In a case where that a device should be controlled by the new piece of software 2, it may be controlled such that push scan settings for the old piece of software 1 may not be displayed when the old piece of software 1 is activated. It may further be programmed such that new piece of software 2 may control not to display push scan settings in the old piece of software 1 when the old piece of software 1 is activated.

According to the above-identified exemplary embodiments, whether push scan settings for a target device are definable by the old piece of software 1 is determined with reference to the three determination results in step S201, step S202, and step S203. However, these exemplary embodiments are not seen to be limiting.

According to the above-described exemplary embodiments, the image reading apparatus 10 is described as an example of the device to be controlled by the computer 20. In other exemplary embodiment a facsimile, a printer, or other devices may be an example of the device controlled by the computer 20.

As described above, in a case where a device is controlled by a plurality of pieces of software, the coexistence of the plurality of pieces of software and definition of settings by one piece of software are allowed while inhibiting definition of settings by other pieces of software. This may allow device control without user's confusion.

Additional embodiment(s) of can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-149873, filed Jul. 18, 2013, which is hereby incorporated by reference herein in its entirety.

What is claimed is:

1. A method for an information processing apparatus capable of communicating with a scan device, the method comprising:
   displaying a setting screen provided by first software, the setting screen being capable of displaying a first region for pull scan which is performed by scan instructions issued from the information processing apparatus and a second region for push scan which is performed by scan instructions issued from the scanning device;
   performing polling processing for push scan to the scan device, based on an operation having been performed on the second region; and
   determining whether second software capable of causing the information processing apparatus to perform the polling processing to the scan device exists in the information processing apparatus,
   wherein if it is not determined that the second software exists in the information processing apparatus, the setting screen including the first region and the second region is displayed, and
   wherein if it is determined that the second software exists in the information processing apparatus, the setting screen that does not include the second region is displayed, whereby polling processing caused by the first software is not performed and polling processing caused by the second software is performed.

2. A non-transitory computer-readable storage medium storing a program for causing a computer to execute an information processing method for an information processing apparatus capable of communicating with a scan device, the method comprising
   displaying a setting screen provided by first software, the setting screen being capable of displaying a first region for pull scan which is performed by scan instructions issued from the information processing apparatus and a second region for push scan which is performed by scan instructions issued from the scanning device;
   performing polling processing for push scan to the scan device, based on an operation having been performed on the second region; and
   determining whether second software capable of causing the information processing apparatus to perform the polling processing to the scan device exists in the information processing apparatus,
   wherein if it is not determined that the second software exists in the information processing apparatus, the setting screen including the first region and the second region is displayed, and
   wherein if it is determined that the second software exists in the information processing apparatus, the setting screen that does not include the second region is displayed, whereby polling processing caused by the first software is not performed and polling processing caused by the second software is performed.

3. The method according to claim 1,
   wherein the first software uses a first protocol,
   wherein the second software uses a second protocol,
   wherein it is determined that the second software causes to the information processing apparatus to perform processing for the push scan to the scan device if an operating system of the information processing apparatus supports the second protocol and the second software supports the scan device, and
   wherein it is determined that the second software should not instruct the reading device to perform the push scan if the operating system of the apparatus does not support the second protocol or the second software does not support the scan device.

4. The method according to claim 1, wherein a name of the information processing apparatus is displayed on an operation panel of the scan device if it is instructed, using the first software or the second software, that the push scan is to be performed.

5. The method according to claim 1, further comprising:
performing determination of a protocol to which priority is given in the scan device, before performing the determining of whether the second software exists in the image processing apparatus,
wherein the first software uses a first protocol and the second software uses a second protocol, and
wherein, in a case where it is determined that the protocol to which the priority is given is the first protocol, the displaying of the setting screen including the first region and the second region is performed without the determining of whether the second software exists in the image processing apparatus being performed.

6. The non-transitory computer-readable storage medium of claim 2, wherein the information processing method further comprises:
performing determination of a protocol to which priority is given in the scan device, before performing the determining of whether the second software exists in the image processing apparatus,
wherein the first software uses a first protocol and the second software uses a second protocol, and
wherein, in a case where it is determined that the protocol to which the priority is given is the first protocol, the displaying of the setting screen including the first region and the second region is performed without the determining of whether the second software exists in the image processing apparatus being performed.

7. The method according to claim 5, wherein the determining of whether the second software exists in the image processing apparatus is performed in a case where it is determined that the protocol to which the priority is given is the second protocol.

8. The non-transitory computer-readable storage medium of claim 6, wherein the determining of whether the second software exists in the image processing apparatus is performed in a case where it is determined that the protocol to which the priority is given is the second protocol.

* * * * *